US011421101B2

(12) United States Patent
Harada et al.

(10) Patent No.: US 11,421,101 B2
(45) Date of Patent: Aug. 23, 2022

(54) AQUEOUS RESIN DISPERSION, METHOD FOR PRODUCING AQUEOUS RESIN DISPERSION, AQUEOUS COATING MATERIAL, AND ADHESIVE

(71) Applicant: Mitsubishi Chemical Corporation, Chiyoda-ku (JP)

(72) Inventors: Akira Harada, Tokyo (JP); Shinsuke Haraguchi, Tokyo (JP); Motomi Tanaka, Tokyo (JP); Jun Itou, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 146 days.

(21) Appl. No.: 16/888,902

(22) Filed: Jun. 1, 2020

(65) Prior Publication Data

US 2020/0291212 A1 Sep. 17, 2020

Related U.S. Application Data

(63) Continuation of application No. PCT/JP2018/045087, filed on Dec. 7, 2018.

(30) Foreign Application Priority Data

Dec. 7, 2017 (JP) ............................ JP2017-235143

(51) Int. Cl.

| | |
|---|---|
| ***C08L 23/14*** | (2006.01) |
| ***C09J 7/24*** | (2018.01) |
| ***C08F 220/18*** | (2006.01) |
| ***C08F 220/32*** | (2006.01) |
| ***C08F 2/00*** | (2006.01) |
| ***C08F 2/16*** | (2006.01) |
| ***C08F 212/08*** | (2006.01) |
| ***C08F 236/20*** | (2006.01) |
| ***C09D 7/40*** | (2018.01) |

(52) U.S. Cl.

CPC .............. *C08L 23/14* (2013.01); *C08F 2/001* (2013.01); *C08F 2/16* (2013.01); *C08F 212/08* (2013.01); *C08F 220/1804* (2020.02); *C08F 220/325* (2020.02); *C08F 236/20* (2013.01); *C09D 7/66* (2018.01); *C09J 7/243* (2018.01); *C08L 2201/54* (2013.01); *C08L 2312/02* (2013.01)

(58) Field of Classification Search

CPC .. C08L 23/14; C08L 2201/54; C08L 2312/02; C09J 7/243; C09D 7/66; C08F 220/1804; C08F 220/325; C08F 2/001; C08F 2/16; C08F 212/08; C08F 236/20

USPC .......................................................... 525/240

See application file for complete search history.

(56) References Cited

U.S. PATENT DOCUMENTS

| | | | |
|---|---|---|---|
| 5,728,767 | A | 3/1998 | Kanetou et al. |
| 2003/0162887 | A1 | 8/2003 | Mitsui et al. |
| 2008/0287594 | A1 | 11/2008 | Kashihara |

FOREIGN PATENT DOCUMENTS

| | | | | | |
|---|---|---|---|---|---|
| JP | 08-067726 | A | | 3/1996 | |
| JP | 2000-264934 | A | | 9/2000 | |
| JP | 2000264934 | A | * | 9/2000 | |
| JP | 2001-294630 | A | | 10/2001 | |
| JP | 2001294630 | A | * | 10/2001 | |
| JP | 2002-308921 | A | | 10/2002 | |
| JP | 2004-091559 | A | | 3/2004 | |
| JP | 2005-146202 | A | | 6/2005 | |
| JP | 2006-036920 | A | | 2/2006 | |
| JP | 2006036920 | A | * | 2/2006 | .............. C08L 51/06 |
| JP | 2007-270122 | | | 10/2007 | |
| JP | 2009-173835 | A | | 8/2009 | |
| JP | 2010-185084 | | | 8/2010 | |
| JP | 2011-246572 | A | | 12/2011 | |
| JP | 2013-133417 | A | | 7/2013 | |
| JP | 2018-104620 | A | | 7/2018 | |

OTHER PUBLICATIONS

Extended European Search Report dated Dec. 4, 2020 in corresponding European Patent Application No. 18885133.1, 4 pages.
Indian Office Action dated Nov. 15, 2021 in Indian Patent Application No. 202017026823, 7 pages.
Office Action dated Apr. 13, 2022, in Chinese Patent Application No. 201880078264.5, filed Dec. 7, 2018 w/attached machine English translation.
Office Action dated May 24, 2022, in Japanese Patent Application No. 2019-558295, filed Dec. 7, 2018 w/attached machine English translation.

* cited by examiner

*Primary Examiner* — Michael M. Bernshteyn
(74) *Attorney, Agent, or Firm* — Oblon, McClelland, Maier & Neustadt, L.L.P.

(57) ABSTRACT

An aqueous resin dispersion with which excellent adhesiveness to a polyolefin base material such as a polypropylene base material can be easily obtained, which can be baked at low temperature, and which is for producing an aqueous coating material; and an aqueous coating material and an adhesive which contain the aqueous resin dispersion, are provided. In an aqueous resin dispersion (C) of the present invention, an olefin polymer (A) and a polymer (B) containing a constitutional unit derived from a radically polymerizable monomer (b1) having a reactive functional group are dispersed in an aqueous medium, a median diameter of the aqueous resin dispersion (C) measured by a dynamic light scattering method is 300 nm or less, and a dry product of the aqueous resin dispersion (C) contains 1 mass % or more of an insoluble component (D) that is insoluble in tetrahydrofuran.

9 Claims, No Drawings

AQUEOUS RESIN DISPERSION, METHOD FOR PRODUCING AQUEOUS RESIN DISPERSION, AQUEOUS COATING MATERIAL, AND ADHESIVE

This application is a continuation application of International Application numbered PCT/JP2018/045087 filed on Dec. 7, 2018, which claims the benefit of a priority of the prior Japanese Patent Application No. 2017-235143, filed Dec. 7, 2017, the content of which are incorporated herein by reference.

TECHNICAL FIELD

The present invention relates to an aqueous resin dispersion, a method for producing an aqueous resin dispersion, an aqueous coating material, and an adhesive.

BACKGROUND ART

Polyolefins such as propylene polymers and propylene-α-olefin copolymers are inexpensive and have excellent mechanical properties, heat resistance, chemical resistance, water resistance, and the like, and therefore are used in a wide range of fields. However, since a polyolefin does not have a polar group in its molecule and has low polarity, painting or adhesion on a polyolefin base material is often difficult.

Known methods for modifying a surface of a polyolefin base material include a method of chemically treating a base material with a chemical or the like and a method of oxidizing a surface of a base material by a corona discharge treatment, a plasma treatment, a flame treatment, and the like. However, in these methods, not only is a special device required, but an effect of improving coatability and adhesiveness is also insufficient.

As a method for modifying a surface of a polyolefin base material, a method in which a surface of a base material is coated with an aqueous resin dispersion containing a modified polyolefin or a graft copolymer in which a hydrophilic polymer is graft-bonded to an olefin polymer as a surface treatment agent, an adhesive, or a coating material is also known. As the modified polyolefin, a chlorinated polypropylene, an acid-modified propylene-α-olefin copolymer, an acid-modified chlorinated polypropylene, and the like are used.

In addition, in order to improve performance of an aqueous resin dispersion as a coating material and storage stability thereof, an aqueous resin dispersion in which a modified polyolefin or a graft copolymer and a polymer obtained by polymerizing a radically polymerizable monomer are complexed is also proposed. For example, Patent Literature 1 to Patent Literature 7 disclose aqueous resin dispersions obtained by emulsion polymerization of radically polymerizable monomers in the presence of a modified polyolefin and a graft copolymer.

CITATION LIST

Patent Literature

[Patent Literature 1]
Japanese Unexamined Patent Application, First Publication No. H8-67726
[Patent Literature 2]
Japanese Unexamined Patent Application, First Publication No. 2006-36920
[Patent Literature 3]
Japanese Unexamined Patent Application, First Publication No. 2013-133417
[Patent Literature 4]
Japanese Unexamined Patent Application, First Publication No. 2004-91559
[Patent Literature 5]
Japanese Unexamined Patent Application, First Publication No. 2002-308921
[Patent Literature 6]
Japanese Unexamined Patent Application, First Publication No. 2005-146202
[Patent Literature 7]
Japanese Unexamined Patent Application, First Publication No. 2011-246572

SUMMARY OF INVENTION

Technical Problem

However, because the aqueous resin dispersions of Patent Literature 2 to Patent Literature 5 do not contain an insoluble component, it is difficult to obtain a sufficient effect of improving adhesiveness to a polyolefin base material, and baking at a high temperature becomes essential to obtain excellent adhesiveness, which leads to an increase in energy consumption. In particular, it is difficult to obtain excellent adhesiveness to a polypropylene base material.

In addition, the aqueous resin dispersions of Patent Literature 1, Patent Literature 6, and Patent Literature 7 have a large particle size, and it is difficult to obtain excellent stability.

An object of the present invention is to provide an aqueous resin dispersion with which excellent adhesiveness to a polyolefin base material such as a polypropylene base material can be easily obtained, and which can be baked at a low temperature; or an aqueous coating material or an adhesive each of which contains the aqueous resin dispersion.

Solution to Problem

The present invention has the following configurations.

[1] An aqueous resin dispersion (C), in which an olefin polymer (A) and a polymer (B) containing a constitutional unit derived from a radically polymerizable monomer (b1) having a reactive functional group are dispersed in an aqueous medium, a median diameter of the aqueous resin dispersion (C) measured by a dynamic light scattering method is 300 nm or less, and a dry product of the aqueous resin dispersion (C) contains 1 mass % or more of an insoluble component (D) that is insoluble in tetrahydrofuran.

[2] The aqueous resin dispersion (C) according to [1], including composite particles of the olefin polymer (A) and the polymer (B).

[3] The aqueous resin dispersion (C) according to [1] or [2], in which a mass ratio (A):(B) of the olefin polymer (A) and the polymer (B) in the insoluble component (D) is within a range of 1:99 to 99:1.

[4] The aqueous resin dispersion (C) according to any one of [1] to [3], in which the radically polymerizable monomer (b1) having a reactive functional group is a radically polymerizable monomer having an epoxy group.

[5] The aqueous resin dispersion (C) according to any one of [1] to [4], in which a content of the constitutional unit derived from the radically polymerizable monomer (b1) having a reactive functional group in the polymer (B) is 0.01 to 50 mass % with respect to all constitutional units constituting the polymer (B).

[6] The aqueous resin dispersion (C) according to any one of [1] to [5], in which the olefin polymer (A) is an olefin polymer to which a hydrophilic polymer is bonded.

[7] A method for producing the aqueous resin dispersion (C) according to any one of [1] to [6], the method including:

a first step of polymerizing a radically polymerizable monomer (b1) having a reactive functional group in an aqueous medium containing an olefin polymer (A) to obtain an aqueous resin dispersion (C1) containing a polymer (B1) containing a reactive functional group; and a second step of adding a radically polymerizable monomer (b2) not having a reactive functional group to the aqueous resin dispersion (C1), and polymerizing the radically polymerizable monomer (b2) not having a reactive functional group to obtain the aqueous resin dispersion (C) containing a polymer (B) having a reactive functional group, in which an amount used of the radically polymerizable monomer (b1) having a reactive functional group in the first step is 50 mass % or more of a total amount used of the radically polymerizable monomer (b1) having a reactive functional group used throughout all production processes, and an amount used of the radically polymerizable monomer (b2) not having a reactive functional group in the second step is 50 mass % or more of a total amount used of the radically polymerizable monomer (b2) not having a reactive functional group used throughout the all production processes.

[8] The method for producing the aqueous resin dispersion (C) according to [7], in which the radically polymerizable monomer (b1) having a reactive functional group is a radically polymerizable monomer having an epoxy group.

[9] The method for producing the aqueous resin dispersion (C) according to [7] or [8], in which the olefin polymer (A) is an olefin polymer to which a hydrophilic polymer is bonded.

[10] An aqueous coating material comprising the aqueous resin dispersion (C) according to any one of [1] to [6].

[11] An adhesive comprising the aqueous resin dispersion (C) according to any one of [1] to [6].

Advantageous Effects of Invention

According to an aqueous coating material and an adhesive each of which contain an aqueous resin dispersion (C) of the present invention, and an aqueous coating material and an adhesive of the present invention, it is possible to easily obtain excellent adhesiveness to a polyolefin base material such as a polypropylene base material and to bake at a low temperature.

DESCRIPTION OF EMBODIMENTS

An aqueous resin dispersion (C) of the present invention is an aqueous resin dispersion in which an olefin polymer (A) and a polymer (B) containing a constitutional unit derived from a radically polymerizable monomer (bp having a reactive functional group are dispersed in an aqueous medium.

<Olefin Polymer (A)>

The olefin polymer (A) is a polymer containing 50 mol % or more of olefin-derived constitutional units with respect to all constitutional units (100 mol %) constituting the olefin polymer (A).

The olefin polymer (A) may be a homopolymer or a copolymer.

The olefin polymer (A) is preferably a propylene polymer containing a propylene-derived constitutional unit from the viewpoint of excellent adhesiveness to a polypropylene base material, and is more preferably a propylene polymer in which a content of propylene-derived constitutional units is 50 mol % or more with respect to all constitutional units (100 mol %) constituting the olefin polymer (A), and having a melting point of 125° C. or lower.

A content of propylene-derived constitutional units in the propylene polymer is preferably 50 mol % or more, more preferably 60 mol % or more, and even more preferably 70 mol % with respect to all constitutional units (100 mol %) constituting the propylene polymer.

A melting point (Tm) of the propylene polymer is preferably 125° C. or lower, more preferably 100° C. or lower, and even more preferably 90° C. or lower. In addition, a melting point of the propylene polymer is preferably 60° C. or higher. For example, a inciting point (Tin) of the propylene polymer is preferably 60° C. to 125° C., more preferably 60° C. to 100° C., and even more preferably 60° C. to 90° C.

In the present specification, a numerical value range represented using "to" includes the upper limit and the lower limit thereof, and "A to B" means A or more and B or less.

The olefin polymer (A) preferably does not contain a chlorine atom from the viewpoint of excellent weather resistance.

Examples of the olefin polymer (A) include an olefin polymer (A1) not having a reactive group (hereinafter also referred to as a "polymer (A1)"), a modified olefin polymer (A2) having a reactive group (hereinafter also referred to as a "polymer (A2)"), and the like, and the polymer (A2) is preferable.

(Polymer (A1))

The polymer (A1) is an olefin polymer not having a reactive group.

The polymer (A1) is not particularly limited, and various known olefin homopolymers and olefin copolymers can be used.

Specific examples include the following polyolefins.

A homopolymer of ethylene or propylene; a copolymer of ethylene and propylene; a copolymer of at least one of ethylene and propylene and a monomer copolymerizable with ethylene and propylene; a copolymer consisting of two or more kinds selected from the group consisting of α-olefins having 4 or more carbon atoms to be described later; a copolymer of an α-olefin having 2 or more carbon atoms and a non-aromatic monomer other than α-olefins such as vinyl acetate, an acrylic acid ester, and methacrylic acid ester; a copolymer of an α-olefin having 2 or more carbon atoms and an aromatic monomer such as an aromatic vinyl monomer or a hydrogenated product thereof; a conjugated diene block copolymer or a hydrogenated product thereof; and the like.

Examples of the monomer copolymerizable with ethylene and propylene include α-olefins having 4 or more carbon atoms such as butene-1, pentene-1, hexene-1, heptene-1, octene-1, cyclopentene, cyclohexene, and norbornene.

The α-olefins having 2 or more carbon atoms are preferably α-olefins having 2 to 4 carbon atoms.

As the polymer (A1), a chlorinated polyolefin obtained by chlorinating the above-mentioned polyolefin may be used.

In a case where the term "copolymer" is simply used, it may refer to a random copolymer or a block copolymer.

A chlorination degree of the chlorinated polyolefin is usually 5 mass % or more, and is preferably 10 mass % or more. In addition, a chlorination degree of the chlorinated polyolefin is usually 40 mass % or less, and is preferably 30 mass % or less. For example, a chlorination degree of the chlorinated polyolefin is 5 mass % to 40 mass %, and is preferably 10 mass % to 30 mass %.

Specific examples of the polymer (A1) include polyethylene, polypropylene, an ethylene-butene copolymer, an ethylene-propylene copolymer, a propylene-butene copolymer, a propylene-hexene copolymer, chlorinated polyethylene, chlorinated polypropylene, a chlorinated ethylene-propylene copolymer, a chlorinated propylene-butene copolymer, an ethylene-vinyl acetate copolymer, hydrogenated products of a styrene-butadiene-styrene block copolymer (SEBS), hydrogenated products of a styrene-isoprene-styrene block copolymer (SEPS), and the like.

One of these examples of the polymer (A1) may be used alone, or two or more may be used in combination.

The polymer (A1) may be linear or branched.

The polymer (A1) preferably contains no chlorine atom. The polymer (A1) is preferably a propylene homopolymer or a copolymer of propylene and an α-olefin other than propylene, and is more preferably a propylene homopolymer, an ethylene-propylene copolymer, or a propylene-butene copolymer.

As the polymer (A1), a propylene polymer containing a constitutional unit derived from propylene is preferable. A content of propylene-derived constitutional units in the propylene polymer is preferably 50 mol % or more, more preferably 60 mol % or more, and even more preferably 70 mol % with respect to all constitutional units (100 mol %) constituting the propylene polymer.

As a content of constitutional units derived from propylene becomes high, adhesiveness to a polypropylene base material tends to increase.

A weight-average molecular weight (Mw) of the polymer (A1) is preferably 5000 to 500000. An Mw of the polymer (A1) is more preferably 10000 or more, even more preferably 50000 or more, and particularly preferably 100000 or more. In addition, an Mw of the polymer (A1) is more preferably 400000 or less. For example, an Mw of the polymer (A1) is preferably 5000 to 500000, more preferably 10000 to 500000, even more preferably 50000 to 500000, and particularly preferably 100000 to 400000.

In a case where an Mw of the polymer (A1) is equal to or more than the above lower limit value, a degree of stickiness of a coating film tends to be small, and adhesiveness to a base material tends to increase. In a case where an Mw of the polymer (A1) is equal to or less than the above upper limit value, a viscosity of the aqueous resin dispersion is further lowered, and therefore preparation of the aqueous resin dispersion tends to be easy.

An Mw is a value converted by a calibration curve obtained by measuring each polymer having a known molecular weight using gel permeation chromatography (GPC).

GPC measurement is carried out by a conventionally known method using a commercially available device using orthodichlorobenzene or the like as a solvent.

A melting point (Tm) of the polymer (A1) is preferably 125° C. or lower, more preferably 110° C. or lower, and even more preferably 100° C. or lower. In addition, a melting point of the polymer (A1) is preferably 60° C. or higher. For example, a melting point of the polymer (A1) is preferably 60° C. to 125° C., more preferably 60° C. to 110° C., and even more preferably 60° C. to 100° C.

In a case where a melting point of the polymer (A1) is equal to or less than the above upper limit value, there is a tendency for a high temperature not to be required for drying and baking after applying the aqueous resin dispersion. In a case where a melting point of the polymer (A1) is equal to or more than the above lower limit value, the polymer (A1) is less likely to become sticky, and is easy to handle in a case where the aqueous resin dispersion is used as a coating material.

A method for producing the polymer (A1) is not particularly limited, and examples thereof include radical polymerization, cationic polymerization, anionic polymerization, coordination polymerization, and the like. These methods may be living polymerization.

In the case of coordination polymerization, for example, a method of polymerizing with a Ziegler-Natta catalyst, a method of polymerizing with a single-site catalyst, and the like can be mentioned, and a method of polymerizing with a single-site catalyst is preferable. The reason for this is that, in general, a single-site catalyst can sharpen a molecular weight distribution and stereoregularity distribution by the design of the ligand.

As the single-site catalyst, for example, a metallocene catalyst, a Brookhart type catalyst or the like can be used. Known metallocene catalysts have symmetric types such as a C1 symmetric type, a C2 symmetric type, a C2V symmetric type, a CS symmetric type, and the like. In the present invention, an appropriate symmetric metallocene catalyst may be selected and used according to stereoregularity of a target olefin polymer.

In addition, polymerization may be in any form such as solution polymerization, slurry polymerization, bulk polymerization, and gas phase polymerization. In the case of solution polymerization or slurry polymerization, examples of solvents include aromatic hydrocarbons such as toluene and xylene; aliphatic hydrocarbons such as hexane, heptane, and octane; alicyclic hydrocarbons such as cyclohexane and methylcyclohexane; halogenated hydrocarbons; esters; ketones; ethers; and the like. Among these, aromatic hydrocarbons, aliphatic hydrocarbons, and alicyclic hydrocarbons are preferable, and toluene, xylene, heptane, and cyclohexane are more preferable.

One of these solvents may be used alone, or two or more may be used in combination.

(Polymer (A2))

The polymer (A2) is a modified olefin polymer having a reactive group.

Examples of reactive groups include a carboxyl group and an anhydride thereof, an amino group, an epoxy group, an isocyanato group, a sulfonyl group, a hydroxyl group, and the like. Among the examples, a carboxyl group and an anhydride thereof are preferable.

Examples of the polymer (A2) include a copolymer (A21) obtained by copolymerizing an olefin and a radically polymerizable monomer having a reactive group, a graft polymer (A22) obtained by graft-polymerizing a radically polymerizable unsaturated compound having a reactive group onto an olefin polymer, and the like.

The copolymer (A21) is obtained by copolymerizing an olefin and a radically polymerizable monomer having a reactive group, and it is a copolymer in which a constitutional unit derived from the radically polymerizable monomer having a reactive group is inserted into a main chain.

Examples of olefins used in the copolymer (A21) include α-olefins such as ethylene, propylene, and butene. One olefin may be used alone, or two or more may be used in combination.

Examples of the radically polymerizable monomer having reactivity used for the copolymer (A21) include α, β-unsaturated carboxylic acids such as acrylic acid and maleic anhydride or anhydrides thereof, and the like.

One of the radically polymerizable monomers having reactivity may be used alone, or two or more may be used in combination.

Specific examples of the copolymer (A21) include an ethylene-acrylic acid copolymer, an ethylene-acrylic acid ester-maleic anhydride copolymer, and the like.

One of these examples of the copolymer (A21) may be used alone, or two or more may be used in combination.

As a method for producing the copolymer (A21), the method described for the polymer (A1) can be similarly used.

The graft polymer (A22) is obtained by, for example, graft-polymerizing and binding a radically polymerizable unsaturated compound having a reactive group onto an olefin polymer.

As the olefin polymer, the above-mentioned polymer (A1) can be used.

Examples of radically polymerizable unsaturated compounds having reactive groups include (meth)acrylic acid, fumaric acid, maleic acid or an anhydride thereof, itaconic acid or anhydrides thereof, crotonic acid, and the like.

One of these may be used alone, or two or more may be used in combination.

In addition, in the present specification, "(meth)acrylic acid" is a general term for acrylic acid and methacrylic acid, and this applies similarly to other compounds.

The graft polymer (A22) is preferably a polymer in which a hydrophilic polymer is bonded to an olefin polymer. Specific examples thereof include maleic anhydride-modified polypropylene and chlorinated products thereof, a maleic anhydride-modified ethylene-propylene copolymer and chlorinated products thereof, a maleic anhydride-modified propylene-butene copolymer, acrylic acid-modified polypropylene and chlorinated products thereof, an acrylic acid-modified ethylene-propylene copolymer and chlorinated products thereof, an acrylic acid-modified propylene-butene copolymer, and the like.

One of these may be used alone, or two or more may be used in combination.

A radical polymerization initiator used for graft polymerization can be appropriately selected from ordinary radical polymerization initiators and used, and examples thereof include organic peroxides, azonitriles, and the like.

Examples of organic peroxides include peroxyketals such as di(t-butylperoxy)cyclohexane; hydroperoxides such as cumene hydroperoxide; dialkyl peroxides such as di(t-butyl) peroxide; diacyl peroxides such as benzoyl peroxide; peroxyesters such as t-butylperoxyisopropyl monocarbonate; and the like.

One of these may be used alone, or two or more may be used in combination.

Examples of azonitriles include azobisbutyronitrile, azobisisopropylnitrile, and the like.

One of these may be used alone, or two or more may be used in combination.

As the radical polymerization initiator, benzoyl peroxide and t-butylperoxyisopropyl monocarbonate are preferable.

A use ratio of the radical polymerization initiator and a graft copolymerization unit of the graft polymer (A22) is preferably 1:100 to 2:1 (molar ratio), and is more preferably 1:20 to 1:1 for radical polymerization initiator:graft copolymerization unit.

A reaction temperature of graft polymerization is usually 50° C. or higher, and is preferably within a range of 80° C. to 200° C. A reaction time of graft polymerization is usually about 2 to 20 hours.

A method for producing the graft polymer (A22) is not particularly limited, and any production method may be used.

Examples of production methods include a method of producing it by heating and stirring it in a solution, a method of producing it by melt-heating while stirring it without a solvent, and a method of producing it by heating and kneading it with an extruder. As a solvent in the case of production in a solution, the solvent exemplified in the production method of the polymer (A1) can be used similarly.

A content of a reactive group in the polymer (A22) is preferably 0.01 to 1 mmol per 1 g of the olefin polymer used in the polymer (A22), that is, 0.01 to 1 mmol/g. A content of a reactive group in the polymer (A22) is more preferably 0.05 mmol/g or more, and even more preferably 0.1 mmol/g or more. In addition, a content of a reactive group in the polymer (A22) is preferably 0.5 mmol/g or less, and more preferably 0.3 mmol/g or less. For example, a content of a reactive group in the polymer (A22) is preferably 0.01 mmol/g to 1 mmol/g, more preferably 0.05 mmol/g to 0.5 mmol/g, and even more preferably 0.1 mmol/g to 0.3 mmol/g.

In a case where a content of a reactive group in the polymer (A22) is equal to or more than the above lower limit value, it has sufficient hydrophilicity, and a dispersed particle size tends to be small. In addition, in a case where a content of a reactive group in the polymer (A22) is equal to or less than the above upper limit value, sufficient adhesiveness to a polypropylene base material tends to be obtained.

In a case where a reactive group in the graft polymer (A22) is, for example, an acidic group such as a carboxyl group or an anhydride thereof or a sulfonyl group, by neutralizing the acidic group with a basic compound, mechanical stability of the aqueous resin dispersion tends to be favorable.

Examples of basic compounds include inorganic bases such as sodium hydroxide, potassium hydroxide, and ammonia; organic bases such as triethylamine, diethylamine, ethanolamine, dimethylethanolamine, 2-methyl-2-amino-propanol, triethanolamine, morpholine, and pyridine; and the like.

A neutralization rate of the graft polymer (A22) by the basic compound is not particularly limited as long as dispersibility in water is obtained, and it is within a range of 1 to 100 mol %. A neutralization rate is preferably 50 mol % or more.

In a case where a neutralization rate of the graft polymer (A22) by the basic compound is equal to or more than the above lower limit value, sufficient dispersibility of the graft polymer (A22) in water is easily obtained.

<Polymer (B)>

The polymer (B) is a polymer other than the olefin polymer (A) containing a constitutional unit derived from a radically polymerizable monomer (b1) (hereinafter referred to as a "radically polymerizable monomer (b1)") containing a reactive functional group (hereinafter referred to as a "reactive functional group (i)").

Since the polymer (B) contains a constitutional unit derived from the radically polymerizable monomer (b1), and thereby the olefin polymer (A) and the polymer (B) form a cross-linked structure, a high coating film strength is obtained. Accordingly, adhesiveness of a coating film formed from the aqueous resin dispersion of the present invention to a polyolefin base material such as a polypropylene base material becomes excellent.

The reactive functional group (i) is a functional group that reacts with a reactive group contained in the polymer (A2). Examples of the reactive functional group (i) include a carboxyl group, a hydroxyl group, an amino group, an epoxy group, an isocyanato group, a sulfonyl group, and the like. From the viewpoint of excellent adhesiveness to a polyolefin base material such as a polypropylene base material, a hydroxyl group and an epoxy group are preferable.

Examples of the radically polymerizable monomer (b1) include hydroxyl-group-containing radically polymerizable monomers such as 2-hydroxyethyl acrylate, 2-hydroxyethyl methacrylate, 3-hydroxypropyl acrylate, 2-hydroxypropyl acrylate, 3-hydroxypropyl methacrylate, 2-hydroxypropyl methacrylate, 4-hydroxybutyl acrylate, 2-hydroxybutyl acrylate, 4-hydroxybutyl methacrylate, 2-hydroxybutyl methacrylate, polypropylene glycol acrylate, and polypropylene glycol methacrylate; and epoxy-group-containing vinyl monomers such as glycidyl methacrylate and methallyl glycidyl ether. Among the examples, a radically polymerizable monomer containing an epoxy group is preferable.

One kind of the radically polymerizable monomer (b1) containing the reactive functional group (i) may be used alone, or two or more kinds thereof may be used in combination.

From the viewpoint of the polymer (B) having excellent polymerizability, and improving stability of the aqueous resin dispersion, the polymer (B) preferably has a constitutional unit derived from a radically polymerizable monomer (b2) (hereinafter referred to as a "radically polymerizable monomer (b2)") that does not have the reactive functional group (i), in addition to the constitutional unit derived from the radically polymerizable monomer (b1).

As the radically polymerizable monomer (b2), a monomer having excellent copolymerizability with the radically polymerizable monomer (b1) is preferable, and a vinyl monomer not having the reactive functional group (i) is more preferable.

Examples of the radically polymerizable monomer (b2) include a (meth)acrylic acid ester not having the reactive functional group (i), an aromatic monomer, an amide monomer, a carboxyl-group-containing vinyl monomer, (meth) acrylonitrile, vinyl acetate, vinyl propionate, vinyl versatate, and the like.

One of these may be used alone, or two or more may be used in combination.

Examples of (meth)acrylic acid esters include methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, hexyl (meth) acrylate, cyclohexyl (meth)acrylate, octyl (meth)acrylate, 2-ethylhexyl (meth)acrylate, nonyl (meth)acrylate, lauryl (meth)acrylate, stearyl (meth)acrylate, (meth)acrylic acid esters having an aryl group or an aralkyl group having 6 to 12 carbon atoms, dimethylaminoethyl (meth)acrylate, diethylaminoethyl (meth)acrylate, 2-methoxyethyl (meth)acrylate, 3-methoxypropyl (meth)acrylate, polyethylene oxide adducts of (meth)acrylic acid, (meth)acrylic acid esters having a fluoroalkyl group having 1 to 20 carbon atoms, and the like. Examples of (meth)acrylic acid esters having an aryl group or an aralkyl group having 6 to 12 carbon atoms include benzyl (meth)acrylate and the like. Examples of (meth)acrylic acid esters having a fluoroalkyl group having 1 to 20 carbon atoms include trifluoromethylmethyl (meth) acrylate, 2-trifluoromethylethyl (meth)acrylate, 2-perfluoroethylethyl (meth)acrylate, and the like.

Examples of aromatic monomers include styrene, α-methylstyrene, and the like.

Examples of amide monomers include (meth)acrylamide, dimethyl (meth)acrylamide, and the like.

Examples of carboxyl-group-containing vinyl monomers include (meth)acrylic acid and the like.

From the viewpoint of weather resistance and solvent resistance, the radically polymerizable monomer (b2) is preferably a (meth)acrylic acid ester or an aromatic monomer. Among examples, isobutyl methacrylate, t-butyl methacrylate, butyl acrylate, styrene, and cyclohexyl methacrylate are more preferable, and styrene, butyl acrylate, and isobutyl methacrylate are particularly preferable, from the viewpoint of adhesiveness to a polypropylene base material.

A content of a constitutional unit derived from the radically polymerizable monomer (b1) in the polymer (B) is preferably 0.01 to 50 mass %, is more preferably 0.05 to 40 mass %, and is even more preferably 0.1 to 30 mass % with respect to all the constitutional units constituting the polymer (B).

In a case where a content of a constitutional unit derived from the radically polymerizable monomer (b1) in the polymer (B) is equal to or more than the above lower limit value, excellent adhesiveness to a polyolefin base material such as a polypropylene base material is easily obtained. In a case where a content of a constitutional unit derived from the radically polymerizable monomer (b1) in the polymer (B) is equal to or less than the above upper limit value, stability of the aqueous resin dispersion is improved.

<Aqueous Resin Dispersion (C)>

In the aqueous resin dispersion (C) of the present invention, the olefin polymer (A) and the polymer (B) may be dispersed as separate particles, or the olefin polymer (A) and the polymer (B) may be dispersed as composite particles. From the viewpoint of stability of the aqueous resin dispersion, the aqueous resin dispersion (C) preferably contains composite particles of the olefin polymer (A) and the polymer (B), and it is preferable that the olefin polymer (A) and the polymer (B) be dispersed as composite particles in the aqueous resin dispersion (C) of the present invention.

A mass ratio of the polymer (B) to the olefin polymer (A) contained in the aqueous resin dispersion (C) (mass (solid content) of the polymer (B)/mass (solid content) of the olefin polymer (A)) is preferably 0.5 to 2. In a case where a mass ratio of the polymer (B) to the olefin polymer (A) contained in the aqueous resin dispersion (C) is equal to or more than the above lower limit value, it is easy to stably produce the aqueous resin dispersion, and storage stability of the aqueous resin dispersion tends to be improved. In a case where a mass ratio of the polymer (B) to the olefin polymer (A) contained in the aqueous resin dispersion (C) is equal to or less than the above upper limit value, initial adhesiveness of a coating film to a polyolefin base material such as a polypropylene base material tends to become favorable.

In a case where the olefin polymer (A) has a reactive group, a total amount of reactive functional groups (i) contained in the polymer (B) is preferably 30 to 1000 mol % and more preferably 50 to 800 mol % with respect to a total amount (100 mol %) of reactive groups contained in the olefin polymer (A) contained in the aqueous resin dispersion. In a case where a total amount of reactive functional groups (i) contained in the polymer (B) with respect to a total amount (100 mol %) of reactive groups contained in the olefin polymer (A) is equal to or more than the above lower limit value, bonds between the olefin polymer (A) and the polymer (B) are sufficiently formed, and adhesiveness of the olefin polymer (A) to a polypropylene base material tends not to be hindered. In a case where a total amount of reactive functional groups (i) contained in the polymer (B) with respect to a total amount (100 mol %) of reactive groups contained in the olefin polymer (A) is equal to or less than the above upper limit value, storage stability tends to be favorable without inhibiting particle properties of the olefin polymer (A) and the polymer (B).

A total concentration of solid contents of the olefin polymer (A) and the polymer (B) in the aqueous resin dispersion (C) is preferably 10 to 60 mass %, and is more preferably 20 to 50 mass %.

An aqueous medium of the aqueous resin dispersion (C) contains water, and if necessary, a solvent other than water. Examples of solvents other than water include methyl ethyl ketone, cyclohexanone, n-propanol, isopropanol, n-butanol, isobutanol, t-butanol, cyclohexanol, tetrahydrofuran, 2-methoxyethanol, 2-ethoxyethanol, 2-butoxyethanol, 2-methoxypropanol, 2-ethoxypropanol, and the like.

One of these may be used alone, or two or more may be used in combination.

The aqueous resin dispersion (C) may contain an optional component other than the olefin polymer (A), the polymer (B), and the aqueous medium.

Examples of optional components include a surfactant to be added for the purpose of improving storage stability, and the like.

As the surfactant, it is possible to use any of various surfactants such as anionic surfactants, cationic surfactants, nonionic surfactants, and polymer surfactants.

Furthermore, a so-called reactive surfactant having an ethylenically unsaturated bond in a surfactant component can also be used. Among the examples, an anionic surfactant is preferable from the viewpoint of improving storage stability of the aqueous resin dispersion (C).

The anionic surfactant is not particularly limited, and it is possible to use, for example, ADEKA REASOAP (registered trademark) SR (trade name, manufactured by ADEKA) which is a reactive surfactant, NEOCOL (registered trademark) SW-C (trade name, manufactured by DKS Co. Ltd.) which is a non-reactive surfactant, and the like.

A content of the surfactant (solid content) in the aqueous resin dispersion (C) is preferably 3 parts by mass or less, and more preferably 2 parts by mass or less with respect to 100 parts by mass (solid content) of the polymer (B).

In a case where a content of the surfactant in the aqueous resin dispersion (C) is equal to or more than the above lower limit value, storage stability of the aqueous resin dispersion tends to be improved, or water resistance is less likely to be impaired, and therefore it is easy to maintain stability when it is used as coating material composition.

A median diameter of the aqueous resin dispersion (C) of the present invention measured by a dynamic light scattering method is 300 nm or less, preferably 250 nm or less, and more preferably 200 nm or less.

In a case where a particle size (median diameter) is equal to or less than the above upper limit value, it is easy to improve adhesiveness to a propylene base material and storage stability when the aqueous resin dispersion is formed into a coating material.

A particle size can be adjusted, for example, by a particle size of the olefin polymer (A) used, polymerization conditions for producing the polymer (B), and the like.

<Method for Producing Aqueous Resin Dispersion (C)>

The aqueous resin dispersion (C) of the present invention can be produced by a method including a first step of polymerizing a radically polymerizable monomer (b1) having a reactive functional group in an aqueous medium containing an olefin polymer (A) to obtain an aqueous resin dispersion (C1) containing a polymer (B1) containing a reactive functional group; and a second step of adding a radically polymerizable monomer (b2) not having a reactive functional group to the aqueous resin dispersion (C1), and polymerizing the radically polymerizable monomer (b2) to obtain the aqueous resin dispersion (C) containing the polymer (B) containing a constitutional unit derived from the radically polymerizable monomer (b1) having a reactive functional group.

An amount of the radically polymerizable monomer (b1) used in the first step is 50 mass % or more, is preferably 60 mass % or more, and is more preferably 80 mass % or more with respect to a total amount (100 mass %) of the radically polymerizable monomer (b1) used throughout all production steps.

In a case where an amount of the radically polymerizable monomer (b1) used in the first step is equal to or more than the above lower limit value, it is easy to achieve both storage stability and PP adhesiveness of the aqueous resin dispersion (C).

An amount of the radically polymerizable monomer (b2) used in the second step is 50 mass %, is preferably 60 mass % or more, and is more preferably 80 mass % or more with respect to a total amount (100 mass %) of the radically polymerizable monomer (b2) used throughout all production steps.

In a case where an amount of the radically polymerizable monomer (b2) used in the second step is equal to or more than the above lower limit value, a polymerization rate of the polymer (B) tends to be favorable.

A method of reacting the olefin polymer (A) with the radically polymerizable monomer (b1) of the present invention is not particularly limited, but a method of heating is preferable from the viewpoint of stability of an aqueous dispersion liquid of the olefin polymer (A).

A temperature for heating is preferably 30° C. or higher, more preferably 40° C. or higher, and particularly preferably 50° C. or higher. In addition, a temperature for heating is preferably 120° C. or lower and more preferably 100° C. or lower. For example, a temperature for heating is preferably 30° C. to 120° C., more preferably 40° C. to 120° C., and even more preferably 50° C. to 100° C.

In a case where a temperature for heating is equal to or more than the above lower limit value, it is easy to obtain sufficient reactivity. In a case where a temperature for heating is equal to or less than the above upper limit value, storage stability of an aqueous dispersion liquid is likely to be favorable.

A time for reacting the olefin polymer (A) and the radically polymerizable monomer (b1) of the present invention is not particularly limited as long as they react, but from the viewpoint of reactivity, it is preferably 5 minutes or longer, more preferably 10 minutes or longer, and particularly preferably 15 minutes or longer.

Regarding the reaction between the olefin polymer (A) and the radically polymerizable monomer (b1) of the present invention, an amount of the monomer (b1) before and after the reaction can be checked by measuring the amount using a gas chromatography/mass spectrometry (GC/MS) device.

A commercially available product may be used as an aqueous dispersion liquid of the olefin polymer (A). Examples of such commercially available products include SUPERCHLON (registered trademark) series (manufactured by Nippon Paper Industries Co., Ltd.), AUROREN (registered trademark) series (manufactured by Nippon Paper Industries Co., Ltd.), HARDLEN (registered trademark) series (manufactured by Toyobo Co., Ltd.), APTOLOK (registered trademark) series (manufactured by Mitsubishi Chemical Corporation), and the like.

The olefin polymer (A) may be produced without using a commercially available product. A method for producing an aqueous dispersion liquid of the olefin polymer (A) is not particularly limited, and it is possible to employ a method of dispersing it by incorporating a surfactant, or a method of dispersing it by using a graft copolymer in which a hydrophilic polymer is graft-bonded to an olefin polymer. From the viewpoint of excellent water resistance and stability, a method of dispersing it by using a graft copolymer in which a hydrophilic polymer is graft-bonded to an olefin polymer is preferable.

A median diameter of an aqueous dispersion liquid of the olefin polymer (A) measured by a dynamic light scattering method is preferably 300 nm or less, more preferably 200 nm or less, and even more preferably 150 nm or less.

In a case where a particle size (median diameter) is equal to or less than the above upper limit value, polymerization stability of the polymer (B) is favorable, and the polymer (B) is easily produced. In addition, a median diameter of the aqueous resin dispersion (C) measured by a dynamic light scattering method can be 300 nm or less, whereby storage stability of the aqueous resin dispersion (C) can easily become favorable.

In the case where an aqueous dispersion liquid of the olefin polymer (A) is produced by being dispersed using a graft copolymer in which a hydrophilic polymer is graft-bonded to an olefin polymer, the hydrophilic polymer is a polymer having an insoluble content of 1% by weight or less when dissolved in water at 25° C. at a concentration of 10% by weight. The hydrophilic polymer can be used without particular limitation as long as the effects of the present invention are not significantly impaired, and any of synthetic polymers, semi-synthetic polymers, and natural polymers can be used. Usually, a number average molecular weight Mn is preferably 300 or more because then mechanical stability of a polyolefin dispersion is excellent.

The synthetic polymer is not particularly limited, and for example, it is possible to use a polyether resin (including an azapolyether resin, the same applies hereinafter), a polyvinyl alcohol resin, a polyvinyl pyrrolidone resin, and the like.

The semi-synthetic polymer is not particularly limited, and for example, it is possible to use carboxylated starch, cationized starch, dextrin, ethyl cellulose, carboxylated methyl cellulose, hydroxyethyl cellulose, cationized cellulose, and the like.

The natural polymer is not particularly limited, and for example, it is possible to use starch, gum arabic, tragacanth gum, casein, gelatin, dextrin, and the like.

Among the examples, synthetic polymers are preferable, a polyvinyl alcohol resin, a polyvinylpyrrolidone resin, and a polyether resin are more preferable, and a highly hydrophilic polyether resin is even more preferable, because a degree of hydrophilicity is easily controlled, and characteristics are stable.

In order to control a particle size of the olefin polymer, one kind thereof may be used alone, or two or more kinds thereof may be used in combination.

The polyether resin is usually obtained by ring-opening polymerization of cyclic alkylene oxide or cyclic alkylene imine The polyether resin may be contained in an aqueous dispersion liquid of the olefin polymer (A), and the olefin polymer (A) and the polyether resin may be bonded. Because the polyether resin does not bleed out, it is preferable that the olefin polymer (A) and the polyether resin be bonded.

A method of bonding the olefin polymer (A) and the polyether resin is not limited, and examples thereof include a method of ring-opening polymerization of a cyclic alkylene oxide or a cyclic alkylene imine in the presence of the olefin polymer (A) having a reactive group, or a method of reacting a reactive group such as a polyether polyol or polyether amine obtained by ring-opening polymerization or the like with a reactive group of the olefin polymer (A).

Polyether polyol is a compound having hydroxyl groups as reactive groups at both ends of a resin having a polyether skeleton. Polyether amine is a compound having a primary amino group as a reactive group at one end or both ends of a resin having a polyether skeleton.

In a case where the olefin polymer (A) and the polyether resin are bonded by a method of reacting a reactive group such as polyether polyol or polyether amine obtained by ring-opening polymerization or the like with a reactive group of the olefin polymer (A), it is preferable to react polyether amine and the olefin polymer (A) to bond them.

A constitutional unit of the polyether resin is preferably composed of hydrophilic polyethylene oxide or polyethylene imine and hydrophobic polypropylene oxide or polypropylene imine, and is more preferably composed of polyethylene oxide and polypropylene oxide. Hydrophilic-Lipophilic Balance (HLB) can be adjusted by the number of repeating units of these polyethylene oxide and polypropylene oxide.

The polyether resin may be used in combination with a hydrophobic polyether resin to adjust the HLB and control a particle size of a polyolefin dispersion.

The term "hydrophobic" means that an amount of insoluble content is 1% by weight or more when dissolved in water at 25° C. at a concentration of 10% by weight.

As the polyether amine, it is possible to use "JEFFAMINE (registered trademark)" M series, D series, and ED series, and "SURFONAMINE (registered trademark)" L series manufactured by Huntsman Corporation.

The polyether resin preferably has one or more reactive groups that may react with the olefin polymer (A) before bonding with the olefin polymer (A). Examples of reactive groups include a carboxylic acid group, a dicarboxylic acid anhydride group, a dicarboxylic acid anhydride monoester group, a hydroxyl group, an amino group, an epoxy group, an isocyanate group, and the like, and the polyether resin preferably has at least an amino group. Because amino groups have high reactivity with various reactive groups such as a carboxylic acid group, a carboxylic acid anhydride group, a glycidyl group, and an isocyanate group, it is easy to bond the olefin polymer (A) and the polyether resin. Amino groups may be primary, secondary, or tertiary, but they are more preferably primary amino groups.

It is sufficient for the polyether resin to have one or more reactive groups, and the number of reactive groups is preferably one. In a case where the number of reactive groups in the polyether resin is one, it is possible to inhibit gelation due to formation of a three-dimensional network structure when bonding with the olefin polymer (A). However, even when the polyether resin has a plurality of reactive groups, it is sufficient for the polyether resin to have only one reactive group that is more reactive than others. For example, a polyether resin having a plurality of hydroxyl groups and one highly reactive amino group is a preferable example. The term reactivity refers to reactivity with a reactive group of the olefin polymer (A).

A weight-average molecular weight (Mw) of the polyether resin is preferably 200 to 200000 which is measured by gel permeation chromatography (GPC) and converted by a polystyrene calibration curve. An Mw of the polyether resin is more preferably 300 or more, and even more preferably 500 or more. In addition, an Mw of the polyether resin is more preferably 100000 or less, even more preferably 10000 or less, and particularly preferably 3000 or less. For example, an Mw of the polyether resin is preferably 200 to 200000, more preferably 300 to 100000, even more preferably 500 to 10000, and particularly preferably 500 to 3000.

In a case where an Mw of the polyether resin is equal to or more than the above lower limit value, surface energy of the aqueous resin dispersion is lowered, and wettability tends to be favorable. In a case where an Mw of the polyether resin is equal to or less than the above upper limit value, viscosity is low, and therefore a resin dispersion tends to be easily prepared.

GPC measurement is performed by a conventionally known method using a commercially available device using tetrahydrofuran (THF) or the like as a solvent.

In an aqueous dispersion liquid of the olefin polymer (A), the olefin polymer (A) and the polyether resin are bonded at a ratio of olefin polymer:polyether resin=100:1 to 100:100 (weight ratio), where a ratio is more preferably 100:5 to 100:70, and even more preferably 100:10 to 100:50.

In a case where a content ratio of the polyether resin in an aqueous dispersion liquid of the olefin polymer (A) is equal to or more than the above lower limit value, it is easy to inhibit a particle size from increasing, and it is easy to prevent deterioration of polymerizability of radically polymerizable monomers. In a case where a content ratio of the polyether resin in an aqueous dispersion liquid of the olefin polymer (A) is equal to or less than the above upper limit value, it is easy to inhibit a decrease in acid value of the aqueous dispersion liquid of the olefin polymer (A), it is easy to prevent deterioration of polymerizability of radically polymerizable monomers, and adhesiveness to a polypropylene base material is unlikely to deteriorate.

In a case where an aqueous dispersion liquid of the olefin polymer (A) is produced by being dispersed using a graft copolymer in which a hydrophilic polymer is graft-bonded to an olefin polymer, examples of methods of dispersing a graft copolymer in water include a method in which a solvent other than water is added and, if necessary, the solvent is heated and dissolved, and then water is added thereto to obtain an aqueous dispersion liquid of the olefin polymer (A); and the like.

In polymerization of a raw material monomer of the polymer (B), any one of batch polymerization or drop polymerization can be used as long as the effects of the present invention are not impaired.

The batch polymerization is a method in which all of monomers are put at one time and then polymerized.

In a case of employing the batch polymerization, for example, a first step of reacting 80 mass % of 100 mass % as a total mass of the radically polymerizable monomer (b1) with an aqueous dispersion liquid of the olefin polymer (A) is performed, and thereafter, a second step of performing radical polymerization after mixing the remaining amount of the radically polymerizable monomer (b1) and the total amount of the radically polymerizable monomer (b2) is performed.

In addition, the drop polymerization is a method in which a monomer is polymerized while being added dropwise little by little.

In a case of employing the drop polymerization, for example, a first step of reacting 80 mass % of 100 mass % as a total mass of the radically polymerizable monomer (b1) with an aqueous dispersion liquid of the olefin polymer (A) is performed, and thereafter, a second step of performing radical polymerization while dropping the remaining amount of the radically polymerizable monomer (b1) and the radically polymerizable monomer (b2) is performed.

From the viewpoint of polymerization stability and adhesiveness to a polyolefin base material such as a propylene base material, it is preferable to employ the batch polymerization for polymerization of a raw material monomer of the polymer (B).

As an initiator used for radical polymerization, initiators generally used for radical polymerization can be used. Specific examples thereof include persulfates such as potassium persul late, sodium persul late, and ammonium persul late; oil-soluble azo compounds such as azobisisobutyronitrile, 2,2'-azobis(2-methylbutyronitrile), 2,2'-azobis(2,4-dimethylvaleronitrile), 2,2'-azobis(4-methoxy-2,4-dimethylvaleronitrile), and 2-phenylazo-4-methoxy-2,4-dimethylvaleronitrile; 2,2'-azobis{2-methyl-N-[1,1-bis(hydroxymethyl)-2-hydroxyethyl]propionamide}, 2,2'-azobis {2-methyl-N-[2-(1-hydroxyethyl)]propionamide}, 2,2'-azobis{2-methyl-N-[2-(1-hydroxybutyl)]propionamide}, 2,2'-azobis[2-(5-methyl-2-imidazolin-2-yl)propane], and salts thereof; 2,2'-azobis[2-(2-imidazolin-2-yl)propane] and salts thereof; 2,2'-azobis{2-[1-(2-hydroxyethyl)-2-imidazolin-2-yl]propane} and salts thereof; 2,2'-azobis(2-methylpropyneamidine) and salts thereof; water-soluble azo compounds such as 2,2'-azobis[N-(2-carboxyethyl)-2-methylpropionamidine]; organic peroxides such as benzoyl peroxide, cumene hydroperoxide, t-butyl hydroperoxide, t-butylperoxy-2-ethylhexanoate, and t-butylperoxyisobutyrate; and the like.

One kind of these initiators may be used alone, or two or more kinds thereof may be used in combination.

In polymerization, a redox polymerization reaction may be carried out by further adding a reducing agent.

As a polymerization method, a method in which a water-soluble initiator is used for polymerization, or a method in which an organic peroxide is used as an initiator, and a redox reaction using ferrous sulfate or isoascorbic acid as a reducing agent is used to perform polymerization is preferable.

A polymerization time is preferably 30 minutes or longer. In addition, a polymerization time is preferably 3 hours or shorter. For example, a polymerization time can be 30 minutes to 3 hours.

In a case where a polymerization time is equal to or more than the above lower limit value, a polymerization rate of a radically polymerizable monomer that is a raw material of the polymer (B) tends to increase. In a case where a polymerization time is equal to or less than the above upper limit value, an amount of cullet generated during the polymerization tends to decrease, and thereby production stability tends to be improved.

When carrying out a polymerization reaction, a known chain transfer agent such as n-dodecyl mercaptan, t-dodecyl mercaptan, and α-methylstyrene dimer may be used as a molecular weight modifier.

In a case where the aqueous resin dispersion is cooled after the polymerization reaction and taken out, it is preferable to carry out a filtration operation to prevent incorporating of foreign matter and cullet. A filtration method is not particularly limited, and for example, a known method such as nylon mesh, bag filter, filter paper, and metal mesh can be used.

<Insoluble Component (D)>

The insoluble component (D) is an insoluble component which is insoluble in tetrahydrofuran (hereinafter referred to as "THF") contained in a dry product of the aqueous resin dispersion (C).

Specifically, to a dry product obtained by drying 1 g of the aqueous resin dispersion (C) at 23° C. for 12 hours to evaporate an aqueous medium, and further drying at 23° C. and 10 Torr for 6 hours using a reduced pressure dryer, THF is added so that a concentration is 1 mass %. The mixture is allowed to stand at 23° C. for 24 hours to dissolve components soluble in THF. A component which is filtered and separated by a filter paper having a retention particle size of 1 μm is the insoluble component.

Examples of the insoluble component (D) include insoluble substances derived from the olefin polymer (A), insoluble substances derived from the polymer (B), insoluble substances formed by bonding of the olefin polymer (A) and the polymer (B), and the like. Among the examples, an insoluble substance formed by bonding of the olefin polymer (A) and the polymer (B) is preferable because it tends to contribute to improvement of water resistance of a coating film.

A content of the insoluble component (D) contained in the dry product (100 mass %) of the aqueous resin dispersion (C) is 1 mass % or more, preferably 5 mass % or more, and more preferably 10 mass % or more.

In a case where a content of the insoluble component (D) contained in the dry product (100 mass %) of the aqueous resin dispersion (C) is equal to or more than the above lower limit value, water resistance of a coating film tends to be favorable.

A mass ratio of the olefin polymer (A) and the polymer (B) contained in the insoluble component (D) (mass (solid content) of the olefin polymer (A):mass (solid content) of the polymer (B)) is preferably 1:99 to 99:1.

A mass ratio of the olefin polymer (A) and the polymer (B) contained in the insoluble component (D) can be calculated by thermal decomposition GC/MS measurement. Specifically, the measurement is performed by a GC/MS device in which the insoluble component (D) contained in the dry product of the aqueous resin dispersion (C) is instantaneously heated and decomposed in a thermal decomposition heating furnace at a high temperature of 500° C. or higher, and the generated thermal decomposition product is directly connected to a thermal decomposition path. A mass ratio can be calculated by comparing each of peak areas derived from the olefin polymer (A) and the polymer (B) from a MS spectrum and a pyrogram obtained by this measurement.

The aqueous resin dispersion (C) of the present invention can be used as a primer, a coating material, an adhesive, an ink binder, a compatibilizing agent for a polyolefin and a different material, and the like, and the aqueous resin dispersion (C) is particularly useful as a coating material, an adhesive, and an ink binder. Usage applications thereof include automotive coating materials for interior/exterior automobiles, coating materials for home appliances such as mobile phones and personal computers, coating materials for building materials, heat sealants, and the like. Among the examples, the aqueous resin dispersion (C) is useful as an aqueous coating material for plastic base materials, particularly polypropylene base materials.

<Aqueous Coating Material>

The aqueous coating material of the present invention contains the aqueous resin dispersion (C) of the present invention.

Dispersed particles of a polymer other than the olefin polymer (A) and the polymer (B) may be blended in the aqueous coating material of the present invention. Examples of such a resin include a polyester resin, a polyurethane resin, an acrylic resin, an acrylic urethane resin, an acrylic silicone resin, a silicone resin, a fluorine resin, an epoxy resin, a polyolefin resin, an alkyd resin, and the like. A polyurethane resin, an acrylic resin, and an acrylic urethane resin are preferable because of their excellent adhesiveness to resin base materials such as polypropylene base materials. A polyurethane resin and an acrylic urethane resin are preferable from the viewpoint of excellent appearance of a coating film. Among the examples, an acrylic urethane resin is particularly preferable from the viewpoint of adhesiveness to a polypropylene base material.

A curing agent may be added to the aqueous coating material of the present invention. Examples of such curing agents include amino resins, polyisocyanate compounds, blocked polyisocyanate compounds, melamine resins, urea resins, carboxyl-group-containing compounds, carboxyl-group-containing resins, epoxy-group-containing resins, epoxy-group-containing compounds, carbodiimide-group-containing compounds, and the like. Polyisocyanate compounds, blocked polyisocyanate compounds, and melamine resins are preferable because of excellent water resistance of a coating film after curing.

Various additives may be blended in the aqueous coating material of the present invention. Examples of additives include various additives such as pigments, resin beads, defoaming agents, pigment dispersants, leveling agents, anti-sagging agents, curing catalysts, matting agents, ultraviolet absorbers, light stabilizers, antioxidants, heat resistance improvement agents, slip agents, preservatives, plasticizers, thickeners, wetting agents, and solvents.

One or more kinds of additives can be used.

Examples of pigments include color pigments, extender pigments, bright pigments, and the like.

Examples of color pigments include titanium oxide, zinc oxide, carbon black, molybdenum red, Prussian blue, cobalt blue, azo pigments, phthalocyanine pigments, quinacridone pigments, isoindoline pigments, slene pigments, perylene pigments, and the like.

Examples of extender pigments include clay, kaolin, barium sulfate, barium carbonate, calcium carbonate, talc, silica, alumina white, and the like.

Examples of bright pigments include aluminum, copper, zinc, brass, nickel, aluminum oxide, mica, aluminum oxide coated with titanium oxide or iron oxide, mica coated with titanium oxide or iron oxide, glass flakes, hologram pigments, and the like.

One or more kinds thereof can be used.

An organic solvent can be used as a film-forming aid for the purpose of increasing a drying speed or for obtaining a surface having a favorable sensation of finish. Examples of organic solvents include alcohols such as methanol, ethanol, and isopropanol; ketones such as acetone; glycols such as ethylene glycol, propylene glycol, ethylene glycol monobutyl ether, diethylene glycol monobutyl ether, and propylene glycol monomethyl ether and ethers thereof; and the like.

The aqueous coating material of the present invention can be applied on a surface of a base material and then baked to form a coating film containing the olefin polymer (A) and the polymer (B) on the surface of the base material.

A baking temperature is preferably 30° C. to 200° C., and is more preferably 40° C. to 180° C.

In a case where a baking temperature is equal to or more than the above lower limit value, it is easy to form a coating film having excellent adhesiveness to a polyolefin base material such as a polypropylene base material. In a case where a baking temperature is equal to or less than the upper limit value, energy consumption can be reduced.

A state of the olefin polymer (A) and the polymer (B) in a coating film can be determined by staining an ultrathin section produced by a general gel embedding method with $RuO_4$, and observing it using a transmission electron microscope.

As described above, in the aqueous resin dispersion (C) of the present invention, the olefin polymer (A) and the polymer (B) containing a constitutional unit derived from the radically polymerizable monomer (b1) having a reactive functional group are dispersed in an aqueous medium. Furthermore, a median diameter of the aqueous resin dispersion (C) measured by a dynamic light scattering method is 300 nm or less. In the aqueous resin dispersion (C), 1 mass % or more of the insoluble component (D) which is insoluble in THF is contained in 100 mass % of a dry product of the aqueous resin dispersion (C). As a result, the aqueous coating material of the present invention containing the aqueous resin dispersion (C) can form a coating film having excellent adhesiveness even to a polyolefin base material such as a polypropylene base material.

<Adhesive>

The adhesive of the present invention contains the aqueous resin dispersion (C) of the present invention.

A coating film formed from the aqueous resin dispersion (C) of the present invention or the aqueous coating material of the present invention has excellent adhesiveness to base materials other than polyolefin base materials such as metal base materials. Accordingly, the adhesive of the present invention containing the aqueous resin dispersion (C) of the present invention can be suitably used as an adhesive for adhering a polyolefin base material to another base material such as a metal base material.

EXAMPLES

Hereinafter, the present invention will be described specifically with reference to examples, but the present invention is not limited to the following descriptions. In addition, "part" and "%" in the examples respectively represent "part by mass" and "mass %." In addition, various measurements, evaluations, and the like were performed by the following method.

[Measurement of Median Diameter]

A median diameter of each of an aqueous dispersion liquid the olefin polymer (A) and the aqueous resin dispersion (C) was obtained by a dynamic light scattering method using a fiber-optics particle analyzer FPAR-1000 (trade name, manufactured by Otsuka Electronics Co., Ltd.).

[Quantification of Insoluble Matter (D)]

An amount of insoluble component (D) was calculated by performing the following operation.

1 g of the aqueous resin dispersion (C) was dried at 23° C. for 12 hours to evaporate an aqueous medium, and further dried at 23° C. and 10 Torr for 6 hours using a vacuum dryer. THF was added to the obtained dry product so that a concentration was 1%, and then the mixture was allowed to stand at 23° C. for 24 hours or longer to dissolve a component soluble in THF. Thereafter, a filtration operation was performed using a filter paper ("No. 5C filter paper (retention particle size 1 μm)" manufactured by Advantec Toyo Roshi Kaisha, Ltd.), and a mass of the residue was measured and calculated.

[Production Stability: Polymerization Rate]

A polymerization rate of each of the radically polymerizable monomer (b1) and the radically polymerizable monomer (b2) was calculated from a solid content of the aqueous resin dispersion (C) by the following formula.

Polymerization rate=((mass of solid content of aqueous resin dispersion (C))−(mass of solid content of olefin polymer))/((mass of radically polymerizable monomer (b1))+(mass of radically polymerizable monomer (b2)))

[Evaluation of Adhesiveness]

1. Initial Adhesiveness

To the solid content of 30 parts of the aqueous resin dispersion of each example, 156 parts (70 parts in solid content) of an acrylic urethane resin dispersion obtained in Production Example 1 to be described later and 3 parts of TEGO (registered trademark) WET KL-245 (trade name, manufactured by EVONIK) as a base wetting agent were added. The mixture was stirred at 700 rpm for 5 minutes using a homodisper agitator (POLYTRON PT-3100). The mixture was allowed to stand at 23° C. for one day. Thereafter, filtration was performed using #355 nylon mesh to remove the residue, thereby obtaining an aqueous coating material.

Next, a surface of a substrate having a thickness of 3 mm formed from polypropylene ("TSOP-6" manufactured by Japan Polypropylene Corporation) was wiped with isopropyl alcohol. This substrate was spray-coated with the obtained aqueous coating material so that a dry film thickness was 20 μm, was set at 23° C. for 10 minutes, and then baked at 90° C. for 30 minutes by a Safeven dryer. Thereby, a coating film was formed. This was left still at 23° C. for 1 day to obtain a test piece.

Next, eleven cuts were made on the coating surface of the test piece at intervals of 1 mm in length and width to reach the substrate, and 100 squares were made. Next, after sticking cellophane adhesive tape on these squares, the adhesive tape was rapidly peeled off. A state of the coating film after peeling off the adhesive tape was observed, and the number of squares of the peeled coating film (hereinafter referred to as "peeled square") was checked. The initial adhesiveness of the coating film to the substrate was evaluated based on the following evaluation standard.

A: A number of peeled squares is 0 or less among 100 squares.

B: A number of peeled squares is 1 to 60 among 100 squares.

C: A number of peeled squares is 61 or more among 100 squares.

2. Water Resistant Adhesiveness

After obtaining a test piece in the same manner as in the evaluation method of "Initial adhesiveness," the test piece was immersed in warm water at 60° C. for 1 day. Next, the test piece was taken out from the warm water and dried at 23° C. for 10 minutes.

Next, eleven cuts were made on the coating surface of the test piece at intervals of 1 mm in length and width to reach the substrate, and 100 grids were made. Next, after sticking cellophane adhesive tape on these grids, the adhesive tape was rapidly peeled off. A state of the coating film after peeling off the adhesive tape was observed, and the number of peeled squares was checked. Water resistant adhesiveness of the coating film to a substrate was evaluated based on the same evaluation standard as that of the initial adhesiveness.

Production Example 1

Acrylic Urethane Resin Dispersion

In a flask equipped with a stirrer, a reflux cooling pipe, a temperature controller, and a dropping pump, a polyester urethane resin (product name: Impranil (registered trademark) DLP-R, manufactured by Sumika Bayer Urethane Co., Ltd., solid content: 40%): 107 parts (42.8 parts as solid content), and deionized water: 32.5 parts were put. Next, NEOCOL (registered trademark) SWC (anionic surfactant, manufactured by DKS Co. Ltd., solid content: 70%): 0.8 parts (0.56 parts as solid content), and ADEKA REASOAP (registered trademark) ER-10 (nonionic surfactant, manufactured by ADEKA): 0.8 parts (0.8 parts as solid content), and as a radically polymerizable monomer, an emulsified liquid in which n-butyl acrylate: 49.9 parts and allyl methacrylate: 0.01 parts were emulsified and dispersed in advance, were put in the flask, and the flask was heated to 50° C. Thereafter, as a polymerization initiator, PERBUTYL (registered trademark) H69 (manufactured by NOF CORPORATION): 0.02 parts (0.013 parts as pure content), and as a reducing agent, ferrous sulfate: 0.0002 parts, ethylenediamine tetraacetic acid (EDTA): 0.000027 parts, sodium isoascorbate: 0.022 parts, and deionized water: 2.0 parts were added. Furthermore, after checking a peak top temperature due to heat of polymerization, an inner temperature of the flask was raised to 75° C. and kept for 20 minutes.

To the dispersion liquid of the polymer thus obtained, an emulsified liquid in which 2-ethylhexyl acrylate: 13.5 parts, isobutyl methacrylate: 28.6 parts, hydroxyethyl methacrylate: 6.5 parts, methacrylic acid: 1.4 parts, NEOCOL (registered trademark) SWC: 0.8 parts (solid content: 0.56 parts), ADEKA REASOAP (registered trademark) ER-10: 0.8 parts, and deionized water: 30 parts were emulsified and dispersed in advance; and an aqueous solution of a polymerization initiator containing sodium hydrogen persulfate: 0.05 parts and deionized water: 10.0 parts were added dropwise over 1 hour. An internal temperature of the flask was kept at 75° C. during the dropwise addition, and the temperature was kept at 75° C. for 1.5 hours after the dropwise addition was completed. Thereafter, the reaction liquid was cooled to room temperature, and 0.7 parts of 28% ammonia water and 0.7 part of deionized water were added. Thereby, an acrylic urethane resin dispersion having a median diameter of 180 nm and a solid content of 45% was obtained.

Example 1

In a flask equipped with a stirrer, a reflux cooling pipe, and a temperature controller, 333.3 parts (100 parts as solid content) of APTOLOK (registered trademark) BW-5683 (manufactured by Mitsubishi Chemical Corporation: solid content 30.0%) as an olefin polymer (A), and 126.3 parts of deionized water were put, and a temperature was raised to 30° C.

Next, 1.3 parts of glycidyl methacrylate (GMA) was added as a radically polymerizable monomer (b1), a temperature was raised to 80° C., and the temperature was maintained for 30 minutes. Thereafter, the mixture was cooled to 50° C. 49.35 parts of butyl acrylate (BA) and 49.35 parts of isobutyl methacrylate (iBMA) were added as the radically polymerizable monomer (b2), and the mixture was kept for 1 hour. Furthermore, 0.02 part of PERBUTYL (registered trademark) H69 (trade name, manufactured by NOF CORPORATION, solid content 69%) as an initiator, 0.0002 part of ferrous sulfate as a reducing agent, 0.00027 parts of ethylenediaminetetraacetic acid (EDTA), 0.08 parts of sodium isoascorbate monohydrate, and 2 parts of deionized water were added to initiate polymerization.

After detecting an exothermic peak of the polymerization, 0.03 parts of PERBUTYL (registered trademark) H69 and 10 parts of deionized water were added dropwise over 15 minutes. After the completion of dropwise addition, the mixture was aged at 60° C. for 30 minutes, and thereby an aqueous resin dispersion having a median diameter of 80 nm and a solid content of 35% was obtained.

Examples 2 to 6 and Comparative Example 1

An aqueous resin dispersion was obtained in the same manner as in Example 1 except that the amounts used of the radically polymerizable monomer (b1) and the radically polymerizable monomer (b2), and the olefin polymer (A) were changed as shown in Table 1.

Example 7

In a flask equipped with a stirrer, a reflux cooling pipe, and a temperature controller, 333.3 parts (100 parts as solid content) of APTOLOK (registered trademark) BW-5683 (manufactured by Mitsubishi Chemical Corporation: solid content 30.0%) as an olefin polymer (A), and 126.3 parts of deionized water were put, and a temperature was raised to 30° C.

Next, 10.00 parts of glycidyl methacrylate (GMA) as the radically polymerizable monomer (b1), 10.00 parts of butyl acrylate (BA) as the radically polymerizable monomer (b2), and styrene (ST) 80.00 parts was put and kept for 1 hour. Furthermore, 0.02 part of PERBUTYL (registered trademark) H69 (trade name, manufactured by NOF CORPORATION, solid content 69%) as an initiator, 0.0002 part of ferrous sulfate as a reducing agent, 0.00027 parts of ethylenediaminetetraacetic acid (EDTA), 0.08 parts of sodium isoascorbate monohydrate, and 2 parts of deionized water were added to initiate polymerization.

After detecting an exothermic peak of the polymerization, 0.03 parts of PERBUTYL (registered trademark) H69 and 10 parts of deionized water were added dropwise over 15 minutes. After the completion of dropwise addition, the mixture was aged at 60° C. for 30 minutes, and thereby an aqueous resin dispersion having a median diameter of 80 nm and a solid content of 35% was obtained.

TABLE 1

| | | | | Example 1 | Example 2 | Example 3 | Example 4 | Example 5 |
|---|---|---|---|---|---|---|---|---|
| Raw material composition of aqueous resin dispersion [parts] | Olefin polymer (A) | BW-5683 | Median diameter 60 nm | 100.00 | 100.00 | — | — | 100.00 |
| | | BW-5635 | Median diameter 120 nm | — | — | 100.00 | — | — |
| | | EW5303 | Median diameter 40 nm | — | — | — | 100.00 | — |
| | Polymer (B) | Radically polymerizable monomer (b1) | GMA | 1.30 | 0.30 | 1.30 | 1.30 | 0.60 |
| | | Radically polymerizable monomer (b2) | BA | 49.35 | 49.85 | 49.35 | 49.35 | 21.10 |
| | | | iBMA | 49.35 | 49.85 | 49.35 | 49.35 | 21.10 |
| | | | ST | — | — | — | — | — |
| | | Cross-linking agent | AMA | — | — | — | — | — |

TABLE 1-continued

| | | | | | | |
|---|---|---|---|---|---|---|
| Characteristics of aqueous resin dispersion | Mass ratio of olefin polymer (A)/polymer (B) | 100/100 | 100/100 | 100/100 | 100/100 | 140/60 |
| | Median diameter [nm] | 80 | 80 | 130 | 75 | 70 |
| | Insoluble component (D) [mass %] | 54 | 37 | 60 | 68 | 62 |
| Evaluation results | Polymerization rate of raw material monomer of polymer (B) [%] | 99 | 99 | 99 | 99 | 93 |
| | Initial adhesiveness | A | A | A | A | A |
| | (peeled squares/total squares) | 0/100 | 0/100 | 0/100 | 0/100 | 0/100 |
| | Water resistant adhesiveness | A | B | A | A | A |
| | (peeled squares/total squares) | 0/100 | 40/100 | 0/100 | 0/100 | 0/100 |

| | | | | Example 6 | Example 7 | Comparative Example 1 |
|---|---|---|---|---|---|---|
| Raw material composition of aqueous resin dispersion [parts] | Olefin polymer (A) | BW-5683 | Median diameter 60 nm | 100.00 | 100.00 | 100.00 |
| | | BW-5635 | Median diameter 120 nm | — | — | — |
| | | EW5303 | Median diameter 40 nm | — | — | — |
| | Polymer (B) | Radically polymerizable monomer (b1) | GMA | 10.00 | 10.00 | 0.01 |
| | | Radically polymerizable monomer (b2) | BA | 10.00 | 10.00 | 50.00 |
| | | | iBMA | — | — | 50.00 |
| | | | ST | 80.00 | 80.00 | — |
| | | Cross-linking agent | AMA | — | — | — |
| Characteristics of aqueous resin dispersion | Mass ratio of olefin polymer (A)/polymer (B) | | | 100/100 | 100/100 | 100/100 |
| | Median diameter [nm] | | | 75 | 80 | 80 |
| | Insoluble component (D) [mass %] | | | 40 | 60 | 0 |
| Evaluation results | Polymerization rate of raw material monomer of polymer (B) [%] | | | 99 | 99 | 99 |
| | Initial adhesiveness | | | A | A | A |
| | (peeled squares/total squares) | | | 0/100 | 0/100 | 0/100 |
| | Water resistant adhesiveness | | | A | A | C |
| | (peeled squares/total squares) | | | 0/100 | 0/100 | 80/100 |

Abbreviations in Table 1 have the following meanings.

BW-5683: APTOLOK (registered trademark) BW-5683, aqueous dispersion liquid of olefin polymer, median diameter 60 nm, manufactured by Mitsubishi Chemical Corporation.

BW-5635: APTLOCK (registered trademark) BW-5635, aqueous dispersion liquid of olefin polymer, median diameter 120 nm, manufactured by Mitsubishi Chemical Corporation.

EW5303: HARDLEN (registered trademark) EW5303, aqueous dispersion liquid of chlorinated olefin polymer, median diameter 40 nm, manufactured by Toyobo Co., Ltd.

GMA: glycidyl methacrylate

BA: butyl acrylate iBMA: isobutyl methacrylate

ST: styrene

AMA: allyl methacrylate

As shown in Table 1, in Examples 1 to 7 in which the aqueous resin dispersion (C) of the present invention was used, a coating film having excellent water resistance could be formed even by baking at a low temperature of 90° C. On the other hand, in Comparative Example 1 in which the aqueous resin dispersion in which an amount of the insoluble component (D) in the solid content was less than 1 mass % was used, a coating film had low water resistance.

INDUSTRIAL APPLICABILITY

According to the present invention, it is possible to easily obtain excellent adhesiveness to a polyolefin base material such as a polypropylene base material and to bake at low temperature.

The invention claimed is:

1. An aqueous resin dispersion (C), wherein an olefin polymer (A) and a polymer (B) containing a constitutional unit derived from a radically polymerizable monomer (b1) having a reactive functional group are dispersed in an aqueous medium, a content of propylene-derived constitutional units is 50 mol % or more with respect to all constitutional units constituting the olefin polymer (A), the radically polymerizable monomer (b1) having a reactive functional group is a radically polymerizable monomer having an epoxy group, a median diameter of the aqueous resin dispersion (C) measured by a dynamic light scattering method is 300 nm or less, and a dry product of the aqueous resin dispersion (C) contains 1 mass % or more of an insoluble component (D) that is insoluble in tetrahydrofuran.

2. The aqueous resin dispersion (C) according to claim 1, comprising composite particles of the olefin polymer (A) and the polymer (B).

3. The aqueous resin dispersion (C) according to claim 1, wherein a mass ratio (A):(B) of the olefin polymer (A) and the polymer (B) in the insoluble component (D) is within a range of 1:99 to 99:1.

4. The aqueous resin dispersion (C) according to claim 1, wherein a content of the constitutional unit derived from the radically polymerizable monomer (b1) having a reactive functional group in the polymer (B) is 0.01 to 50 mass % with respect to all constitutional units constituting the polymer (B).

5. The aqueous resin dispersion (C) according to claim 1, wherein the olefin polymer (A) is an olefin polymer to which a hydrophilic polymer is bonded.

6. A method for producing the aqueous resin dispersion (C) according to claim 1, the method comprising:

first polymerization of a radically polymerizable monomer (b1) having a reactive functional group in an aqueous medium containing an olefin polymer (A) to obtain an aqueous resin dispersion (C1) containing a polymer (B1) containing a reactive functional group, wherein a content of propylene-derived constitutional units is 50 mol % or more with respect to all constitutional units constituting the olefin polymer (A), and the radically polymerizable monomer (b1) having a reactive functional group is a radically polymerizable monomer having an epoxy group; and addition of a radically polymerizable monomer (b2) not having a reactive functional group to the aqueous resin dispersion (C1), and second polymerization of the radically polymerizable monomer (b2) not having a reactive functional group to obtain the aqueous resin dispersion (C) containing a polymer (B) having a reactive functional group, wherein an amount used of the radically polymerizable monomer (b1) having a reactive functional group in the first polymerization is 50 mass % or more of a total amount used of the radically polymerizable monomer (b1) having a reactive functional group used throughout all production processes, and an amount used of the radically polymerizable monomer (b2) not having a reactive functional group in the second polymerization is 50 mass % or more of a total amount used of the radically polymerizable monomer (b2) not having a reactive functional group used throughout the all production processes.

7. The method for producing the aqueous resin dispersion (C) according to claim 6, wherein the olefin polymer (A) is an olefin polymer to which a hydrophilic polymer is bonded.

8. An aqueous coating material comprising the aqueous resin dispersion (C) according to claim 1.

9. An adhesive comprising the aqueous resin dispersion (C) according to claim 1.

* * * * *